United States Patent
Lin et al.

(10) Patent No.: US 8,345,192 B2
(45) Date of Patent: Jan. 1, 2013

(54) MULTIPLE CELL GAPS TRANSREFLECTIVE LCD AND FABRICATING METHOD THEREOF

(75) Inventors: Yung-Lun Lin, Hsin-Chu (TW); Hsiu-Chi Tung, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 126 days.

(21) Appl. No.: 13/102,154

(22) Filed: May 6, 2011

(65) Prior Publication Data

US 2011/0205476 A1     Aug. 25, 2011

Related U.S. Application Data

(62) Division of application No. 12/189,885, filed on Aug. 12, 2008, now Pat. No. 7,965,358.

(30) Foreign Application Priority Data

Sep. 3, 2007 (TW) .............................. 96132794 A (51) Int. Cl.
*G02F 1/1335* (2006.01)
(52) U.S. Cl. ........................................................ 349/114
(58) Field of Classification Search .................. None
See application file for complete search history.

(56) References Cited

U.S. PATENT DOCUMENTS

| | | | |
|---|---|---|---|
| 6,037,084 A | 3/2000 | Ting et al. | |
| 7,002,647 B2 | 2/2006 | Tanaka | |
| 7,245,338 B2 | 7/2007 | Nagata et al. | |
| 2004/0227877 A1 | 11/2004 | Jeong et al. | |
| 2005/0140868 A1 | 6/2005 | Hwang | |
| 2005/0270449 A1 | 12/2005 | Koma et al. | |
| 2006/0227264 A1 | 10/2006 | Noda | |

FOREIGN PATENT DOCUMENTS

| | | |
|---|---|---|
| CN | 1457451 | 11/2003 |
| CN | 1550855 | 8/2004 |
| CN | 1637546 | 7/2005 |
| CN | 1650222 | 8/2005 |
| JP | 7175050 | 7/1995 |
| JP | 2004233959 | 8/2004 |
| TW | 200424680 | 11/2004 |
| TW | 200539454 | 2/2005 |
| TW | 200712633 | 4/2007 |

OTHER PUBLICATIONS

English language translation of abstract and pertinent parts of TW 200424680 (published Nov. 16, 2004).
English language translation of abstract and pertinent parts of TW 200539454 (published Feb. 5, 2005).
English language translation of abstract and pertinent parts of TW 200712633 (published Apr. 1, 2007).
Notice of Allowance mailed May 30, 2011 for serial No. TW 096132794 filed Sep. 3, 2007 along with the English translation.
English language translation of abstract and pertinent parts of CN 1457451 (published Nov. 19, 2003).

(Continued)

*Primary Examiner* — Sung Pak
(74) *Attorney, Agent, or Firm* — McClure, Qualey & Rodack, LLP (57) ABSTRACT

A LCD having multiple cell gaps and a method producing the same are provided. By stacking various numbers of dielectric layers and/or a photosensitive organic layer with various thicknesses on a display array substrate, various cell gaps for pixels of various colors can be obtained.

13 Claims, 14 Drawing Sheets

OTHER PUBLICATIONS

English language translation of abstract and pertinent parts of CN 1550855 (published Dec. 1, 2004).

English language translation of abstract and pertinent parts of CN 1637546 (published Jul. 13, 2005).

English language translation of abstract and pertinent parts of CN 1650222 (published Aug. 3, 2005).

English language translation of abstract and pertinent parts of JP 7175050 (published Jul. 14, 1995).

English language translation of abstract and pertinent parts of JP 2004233959 (published Aug. 19, 2004).

MULTIPLE CELL GAPS TRANSREFLECTIVE LCD AND FABRICATING METHOD THEREOF

RELATED APPLICATIONS

The present invention is a division of U.S. application Ser. No. 12/189,885, filed Aug. 12, 2008, which claims priority to Taiwan Application Serial Number 96132794, filed Sep. 3, 2007, which is herein incorporated by reference.

BACKGROUND

1. Field of Invention

The present invention relates to a liquid crystal display and a method producing the same. More particularly, the present invention relates to a transreflective liquid crystal display and a method producing the same.

2. Description of Related Art

One solution for solving chromatic dispersion problem of conventional transreflective liquid crystal display (LCD) is to use multiple cell gaps LCD comprising bumps with various thicknesses able to adapt wavelengths of three primary colors. Another solution is attaching two compensative films (¼ wavelength and ½ wavelength) respectively to the outer surfaces of the two substrates. However, the solutions are complicated or may reduce LCD brightness.

SUMMARY

Accordingly, a LCD having multiple cell gaps and a method producing the same are provided.

In one embodiment, a first substrate having a first pixel area, a second pixel area, and a third pixel area is provided. A first dielectric layer and a second dielectric layer are formed over the first, the second and the third pixel areas. The second dielectric layer on the second and the third pixel areas is removed, and the first dielectric layer on the third pixel area is then removed. A second substrate and the first substrate are assembled, and first, second and third gaps are formed respectively on the first, the second and the third pixels, and between the first substrate and the second substrate. Liquid crystal is then filled between the first and the second substrates.

In another embodiment, a first substrate having a first pixel area, a second pixel area, and a third pixel area is provided. A photosensitive organic layer is formed on the first substrate and then exposed, wherein the photosensitive organic layer has first, second, and third exposing depths respectively on the first, the second, and the third pixel areas. The photosensitive organic layer is developed to remove the exposed portions thereof. A second substrate is assembled on the first substrate, and first, second and third gaps are formed respectively on the first, the second and the third pixels, and between the first substrate and the second substrate. Liquid crystal is then filled between the first and the second substrates.

In still another embodiment, the methods described above can be combined together to form a LCD having multiple cell gaps.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

According to embodiments of this invention, an LCD having multiple cell gaps is formed by stacking various numbers of dialectic layers and/or photosensitive organic layers with various thicknesses to form various cell gaps on pixels of different colors.

Embodiment 1

Figure 1A:
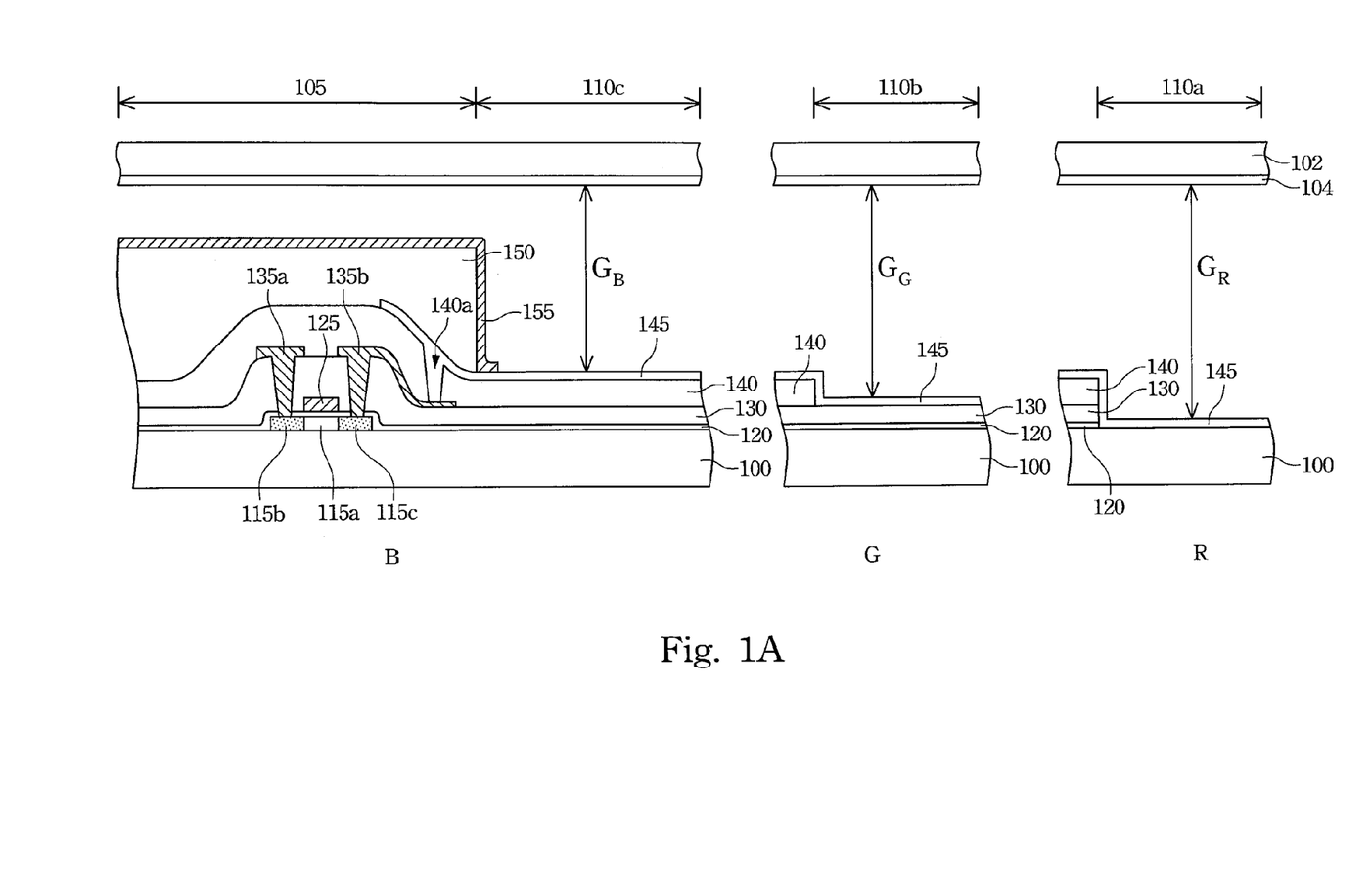
FIG. 1A is a cross-sectional diagram showing red (R), green (G) and blue (B) pixel structures of a transreflective LCD according to an embodiment of this invention.

FIG. 1A is a cross-sectional diagram showing red (R), green (G) and blue (B) pixel structures of a transreflective LCD according to an embodiment of this invention. Since the wavelengths of red light, green light and blue light are decreased in turn; the height difference between the transparent area 110a and the reflective area 105 in the red pixel is the largest. In red pixel, the height difference is at least the total thicknesses of the gate dielectric layer 120, the dielectric layer 130, the protective layer 140 and the organic planar layer 150. The height difference between the transparent area 110b and the reflective area 105 in the green pixel is smaller. In green pixel, the height difference is at least the total thicknesses of the protective layer 140 and the organic planar layer 150. The height difference between the transparent area 110c and the reflective area 105 in the blue pixel is the smallest. In blue pixel, the height difference is at least the thickness of the organic planar layer 150. The above three height differences are utilized to form three cell gaps $G_B$, $G_G$ and $G_R$ respectively between the red, green, blue pixels of the bottom substrate 100 and the top substrate 102.

The red pixel is taken as an example to illustrate a process of manufacturing a red pixel of a transreflective LCD according to an embodiment of this invention, and the cross-sectional diagrams of this process are shown in FIGS. 1B-1F.

Figure 1B:
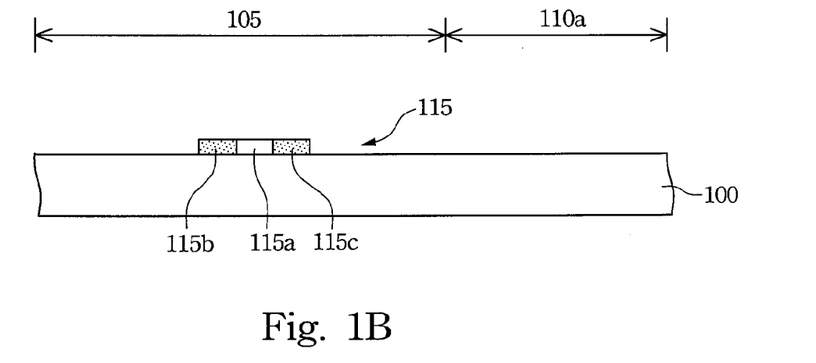
FIGS. 1B-1F are cross-sectional diagrams showing a process of manufacturing a red pixel of a transreflective LCD according to an embodiment of this invention.

In FIG. 1B, a substrate 100 having at least a reflective area 105 and at least a transparent area 110a is provided. A patterned semiconductor layer, such as a silicon island 115 made of polysilicon, is formed on the reflective area 105. Next, ions are implanted into two ends of the silicon island 115 to form a source region 115b, a drain region 115c and a channel region 115a therebetween.

Figure 1C:
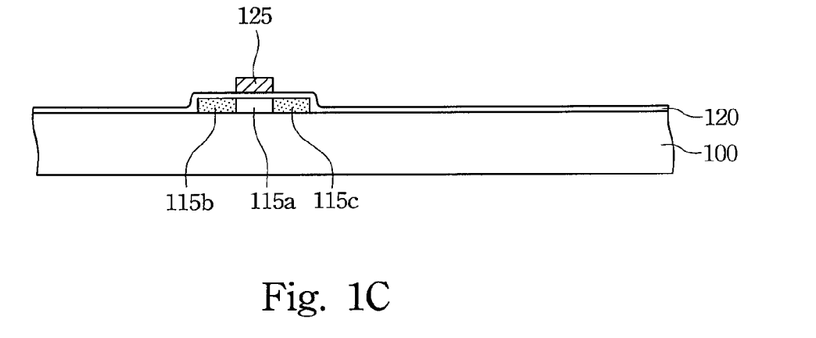

In FIG. 1C, a gate dielectric layer 120 and a first metal layer are sequentially formed on the bottom substrate 100. The first metal layer is then patterned to form a gate 125 above the channel region 115a. According to an embodiment, the thickness of the gate dielectric layer is about 100-1000 Å. A material of the gate 125 can be molybdenum (Mo), for example.

Figure 1D:
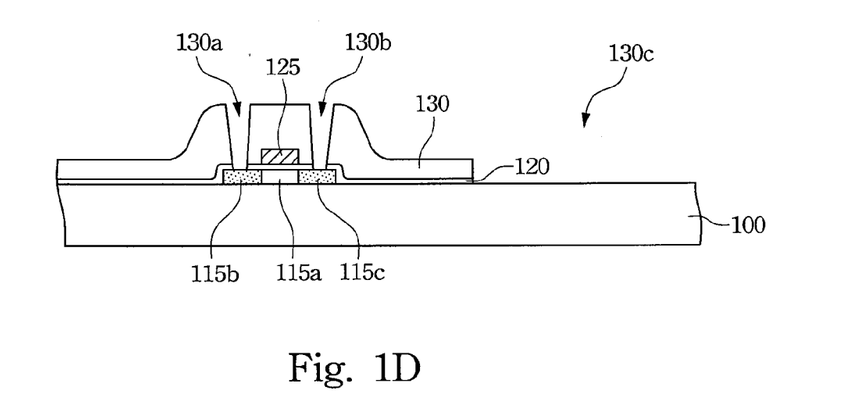

In FIG. 1D, a dielectric layer 130 is formed on the bottom substrate 100. The dielectric layer 130 can be made of a silicon oxide layer having a thickness of about 1000-3000 Å and a silicon nitride layer having a thickness of about 100-500 Å. Next, the dielectric layer 130 and the gate dielectric layer 120 are patterned to form a source opening 130a, a drain opening 130b and a first transparent opening 130c to respectively expose the source region 115, the drain region 115c and the transparent area 110a on the bottom substrate 100.

Figure 1E:
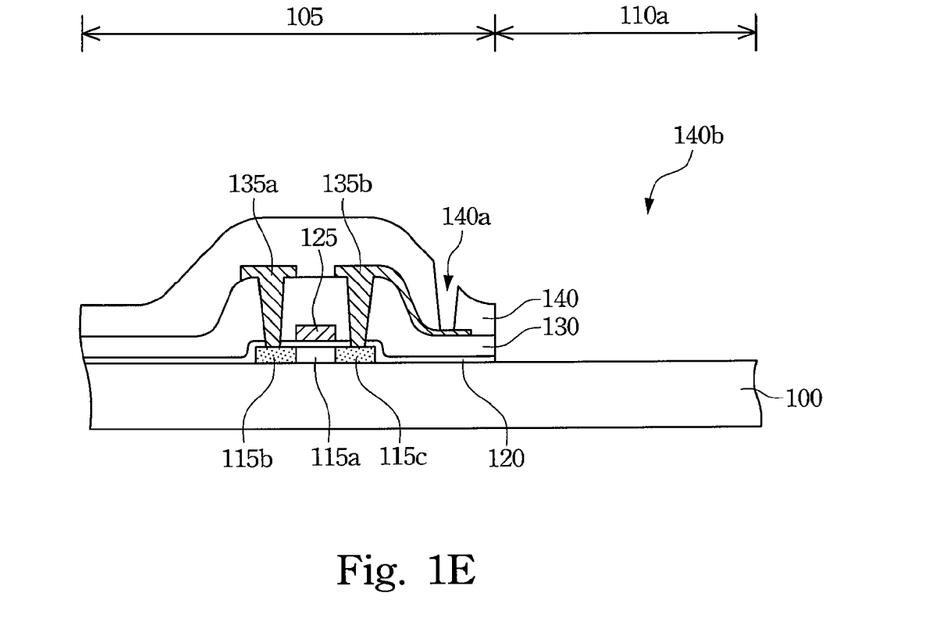

In FIG. 1E, a second metal layer is formed on the bottom substrate 100 and in the source opening 130a, the drain opening 130b and the first transparent opening 130c. The second metal layer is then patterned to form source metal 135a in and surrounding the source opening 130a and the drain metal 135b in and surrounding the drain opening 130b. The second metal layer can be formed by an Al/Ti/Al composite metal layer, for example.

A protective layer 140 is formed on the bottom substrate 100. The protective layer can be a silicon nitride layer having a thickness of about 1000-3000 Å, for example. The protective layer 140 is patterned to form a pixel opening 140a and a second transparent opening 140b to respectively expose the drain metal 135b and the transparent area 110a.

Figure 1F:
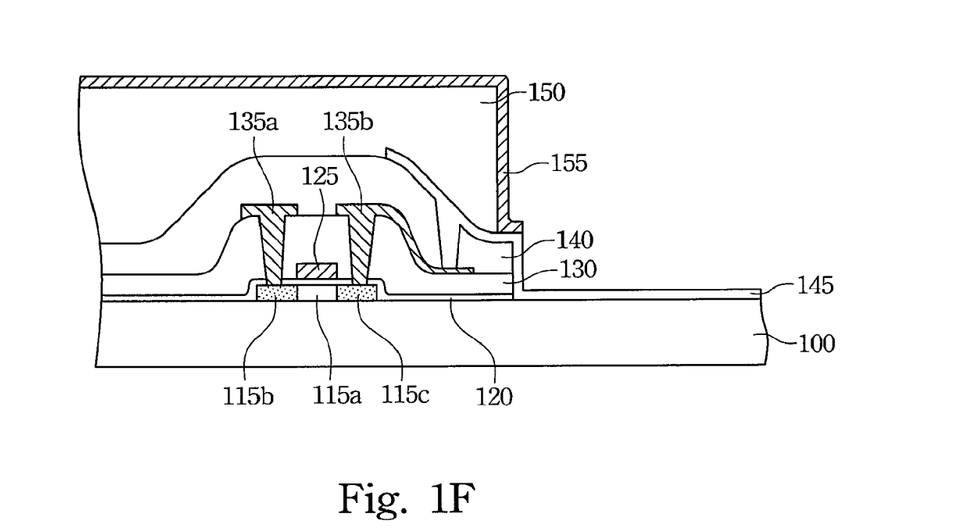

In FIG. 1F, a transparent electrode 145 is formed over the transparent area 110a and a portion of the protective layer 140 and in the pixel opening 140a to electrically connect the drain metal 135b through the pixel opening 140a. An organic planar layer 150 and a reflective electrode 155 are sequentially formed on the reflective area 105. The reflective electrode 155 electrically connects the transparent electrode 145 on the border of planar organic layer 150. The thickness of the planar organic layer 150 is about 1-3 μm, for example.

Embodiment 2

Figure 2A:
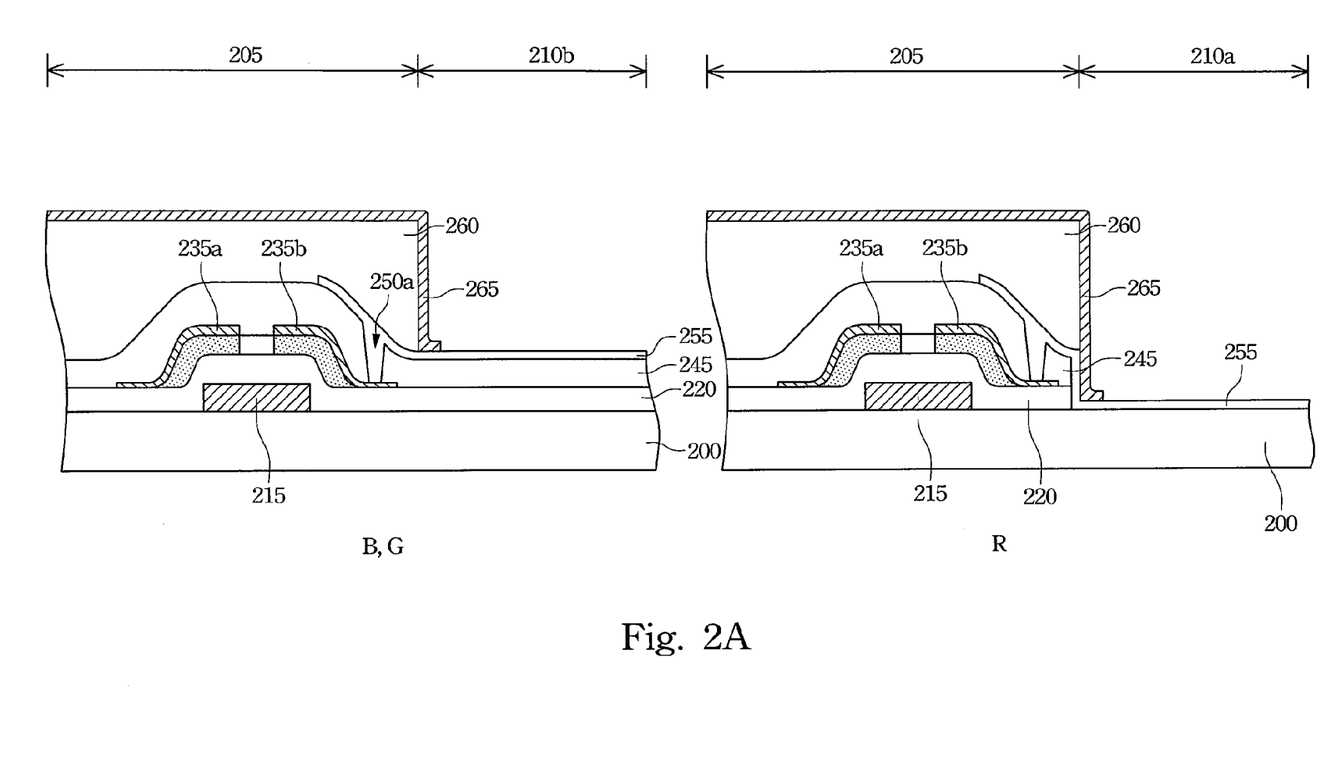
FIG. 2A is a cross-sectional diagram showing red (R), green (G) and blue (B) pixel structures of a transreflective LCD according to another embodiment of this invention.

FIG. 2A is a cross-sectional diagram showing red (R), green (G) and blue (B) pixel structures of a transreflective LCD according to another embodiment of this invention. Similarly, since the wavelengths of red light, green light and blue light are decreased in turn, the height difference, which is at least the total thicknesses of the gate dielectric layer 220, the protective layer 245 and the planar organic layer 260, between the transparent area 210a and the reflective area 205 in the red pixel is the largest. Next, the height difference, which is at least the thickness of the planar organic layer 260, between the transparent area 210b and the reflective area 205 in green and blue pixels is smaller.

Figure 2B:
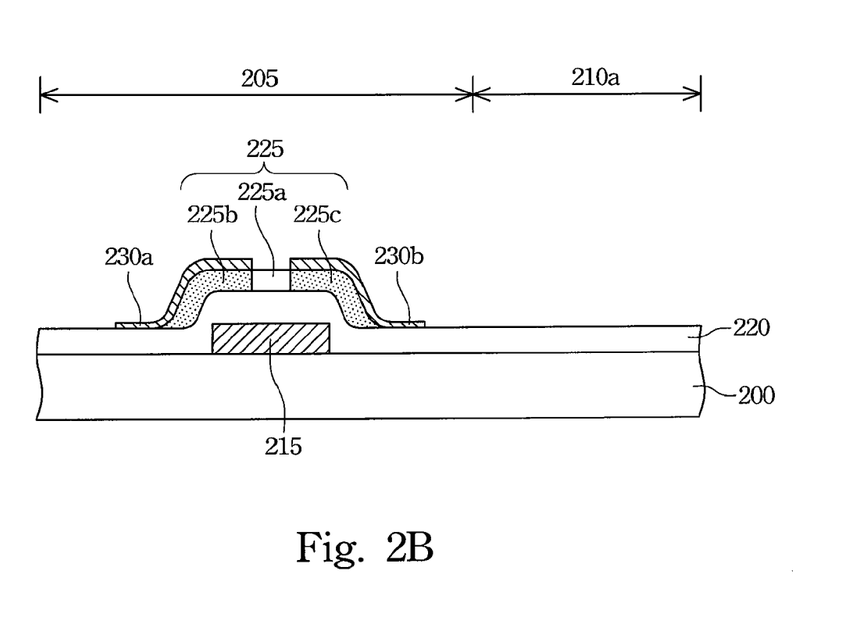
FIGS. 2B-2D are cross-sectional diagrams showing a process of manufacturing a red pixel of a transreflective LCD according to another embodiment of this invention.
Figure 2C:
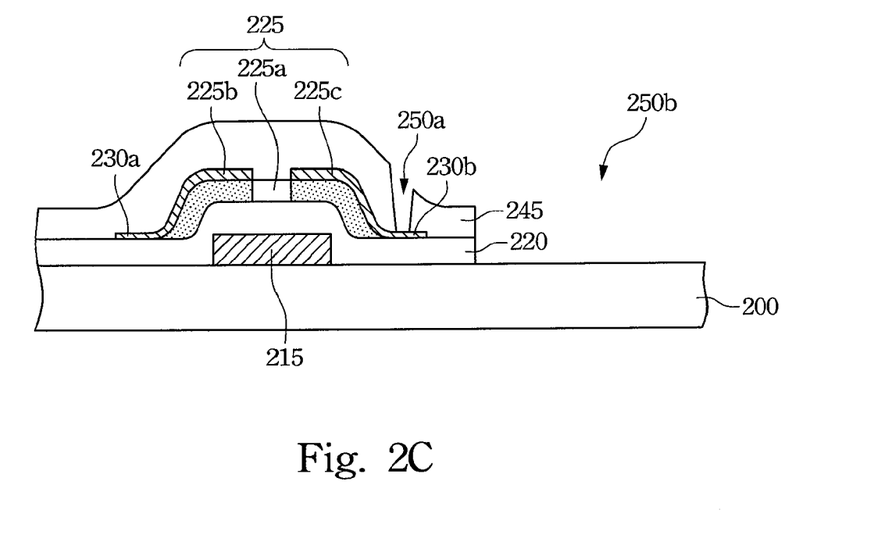
Figure 2D:
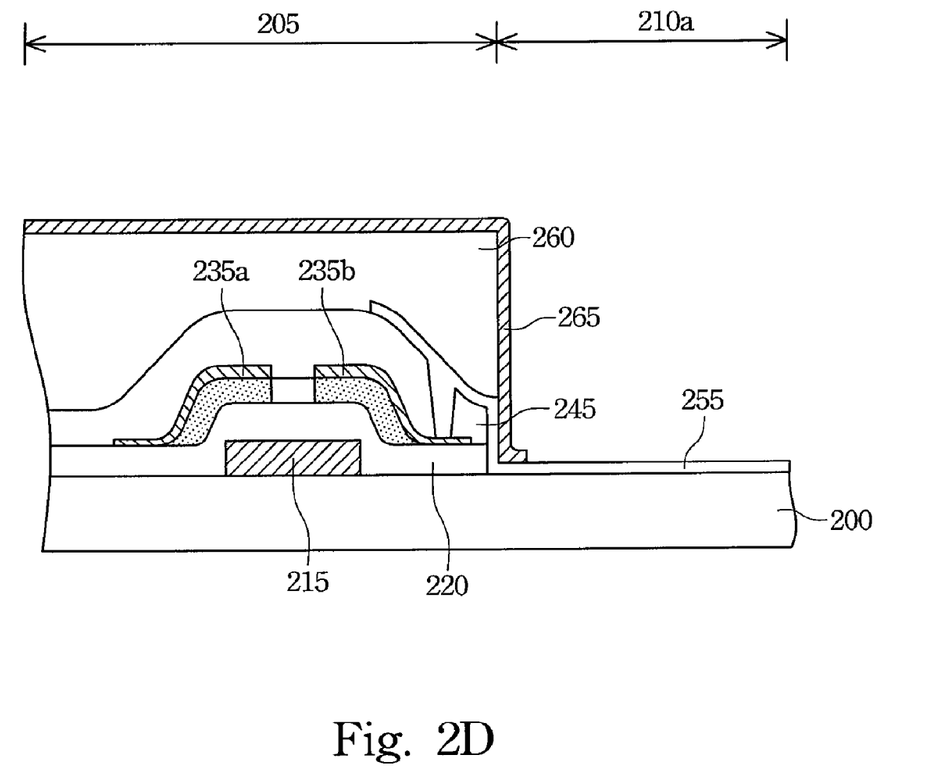

The red pixel is taken as an example to illustrate a process of manufacturing a red pixel of a transreflective LCD according to another embodiment of this invention, and the cross-sectional diagrams of this process are shown in FIGS. 2B-2D.

In FIG. 2B, a substrate 200 having at least a reflective area 205 and at least a transparent area 210a is provided. A gate 215 is formed on the reflective area 205, and a gate dielectric layer 220 is then formed on the substrate 200. A silicon island 225 having a doping surface layer is formed on the gate dielectric layer 220 and above the gate 215. A source metal 230a and a drain metal 230b are formed on two sides of the silicon island 225. The exposed doping surface layer is removed to form a channel region 225a. The two regions on two sides of the channel region 225a are a source region 225b and a drain region 225c, respectively.

In FIG. 2C, a protective layer 245 is formed over the substrate 200 and then patterned to form a pixel opening 250a and a transparent opening 250b to respectively expose the drain metal 230b and the transparent area 210a.

In FIG. 2D, a transparent electrode is formed on the transparent area 210a and in the pixel opening 250a to electrically connect the drain metal 235b. A planar organic layer 260 and a reflective electrode 265 are sequentially formed on the reflective area 205. The reflective electrode 265 electrically connects the transparent electrode 255 on the border of planar organic layer 260.

Embodiment 3

The transparent electrode, electrically connecting the drain metal, is first formed in embodiments 1 and 2, and the reflective electrode is then formed to electrically connect the transparent electrode. According to other embodiment, the reflective electrode can be first formed to electrically connect the drain metal, and the transparent electrode is then formed to electrically connect the reflective electrode. This invention can also be applied on transmission type LCDs with the reflective electrode replaced by a transparent electrode.

Figure 3A:
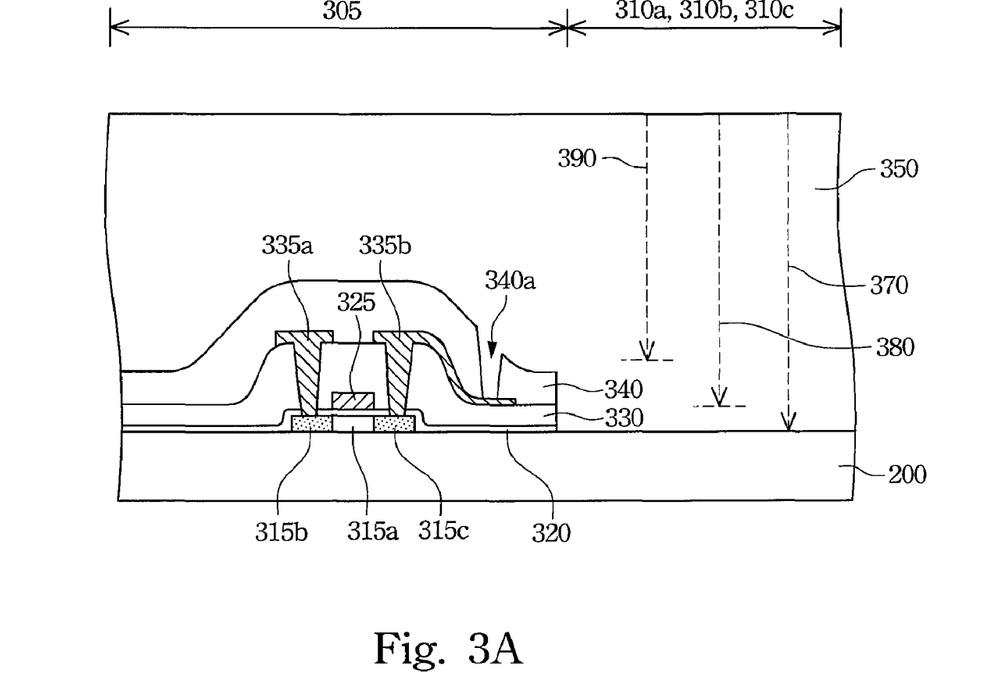
FIGS. 3A-3B are cross-sectional diagrams showing a process of manufacturing pixels of a transreflective LCD according to another embodiment of this invention.
Figure 3B:
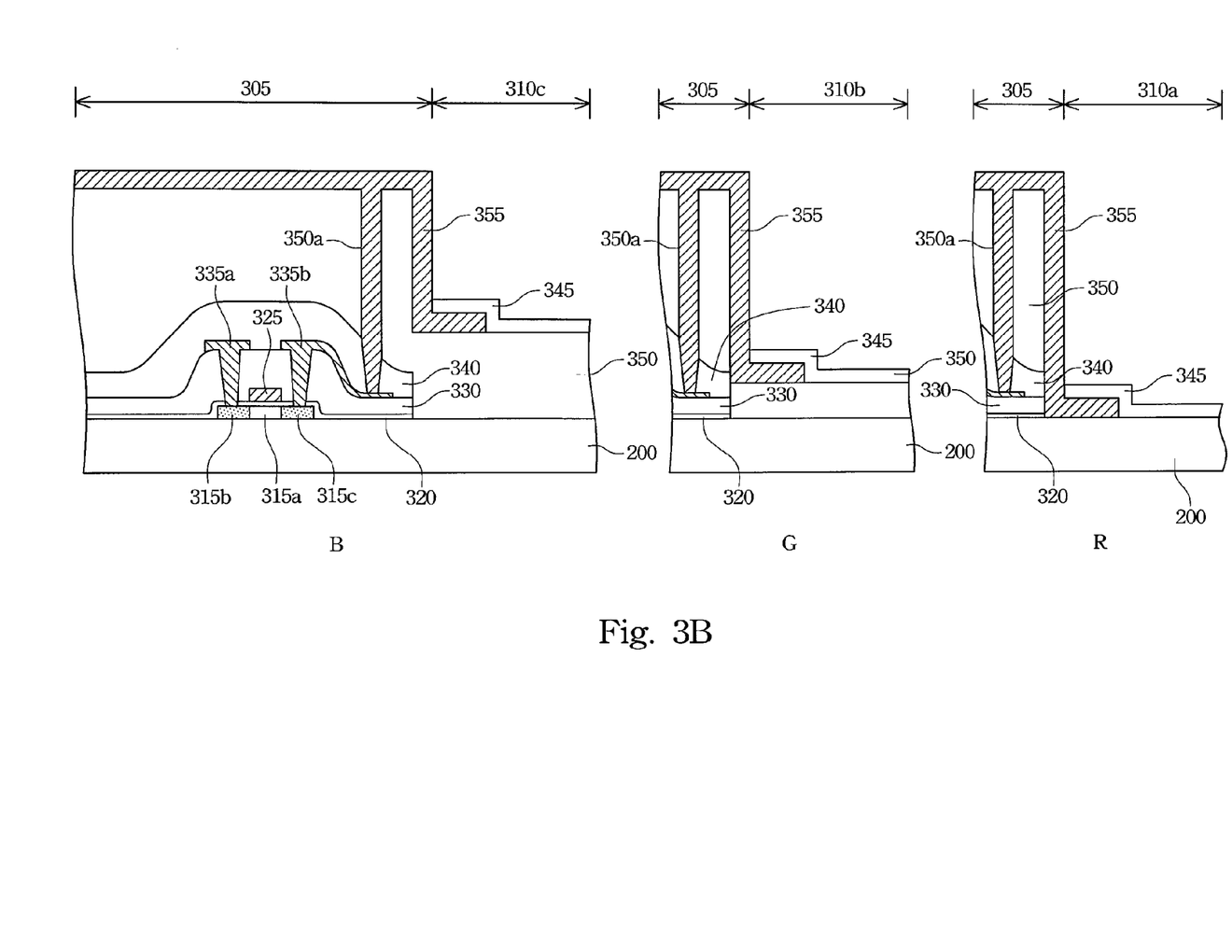

FIGS. 3A-3B are cross-sectional diagrams showing a process of manufacturing pixels of a transreflective LCD according to another embodiment of this invention. Since the processes before FIG. 3A are the same as those shown in FIGS. 1A-1D, the related descriptions are thus skipped. The elements in FIGS. 3A-3D equivalent to those in FIGS. 1A-1D are denoted by adding 200 to the reference numbers of equivalent elements in FIGS. 1A-1D.

In FIG. 3A, which follows FIG. 1D, a protective layer 340 is formed, and a first pixel opening 240a is formed in the protective layer 340. Next, a photosensitive planar organic layer 350 is formed over the substrate 300.

In FIGS. 3A and 3B, the photosensitive planar organic layer 350 is then exposed by gray tone or multi tone exposing method and developed. The exposing depths of the transparent areas 310a in red pixel, 310b in green pixel, and 310c in blue pixels are a first depth 370, a second depth 380, and a third depth 390, respectively, to produce various height differences between the reflective area 305 and the transparent areas 310a, 310b, and 310c. At the same time, the photosensitive planar organic layer 350 in the pixel opening 340a is fully exposed to form a second pixel opening 350a.

In FIG. 3B, a reflective electrode 355 is formed on the reflective area 305 and in the second pixel opening 350a to electrically connect the drain metal 335b through the second pixel opening 350a. Since the residual heights of the photosensitive planar organic layer 350 on the transparent areas 310a, 310b, and 310c are varied, the height differences between the reflective area 305 and the transparent areas 310a, 310b, and 310c are also varied. Then, transparent electrodes 345 are respectively formed on the transparent areas 310a, 310b, and 310c to electrically connect the reflective electrode 355.

Although only a top-gate is demonstrate in the above example, the method described above can also be applied on manufacturing transreflective LCDs having bottom-gate structures.

Embodiment 4

The various combinations of the gate dielectric layer, the dielectric layer, and the protective layer of embodiment 1 can also be combined with the photosensitive planar organic layer with various exposing depths of embodiment 3 to adjust the cell gaps of various color pixels.

FIGS. 4A-4D are cross-sectional diagrams showing a process of manufacturing pixels of a transreflective LCD according to another embodiment of this invention. The elements in FIGS. 4A-4D equivalent to those in FIGS. 1A-1F are denoted by adding 300 to the reference numbers of equivalent elements in FIGS. 1A-1F.

Figure 4A:
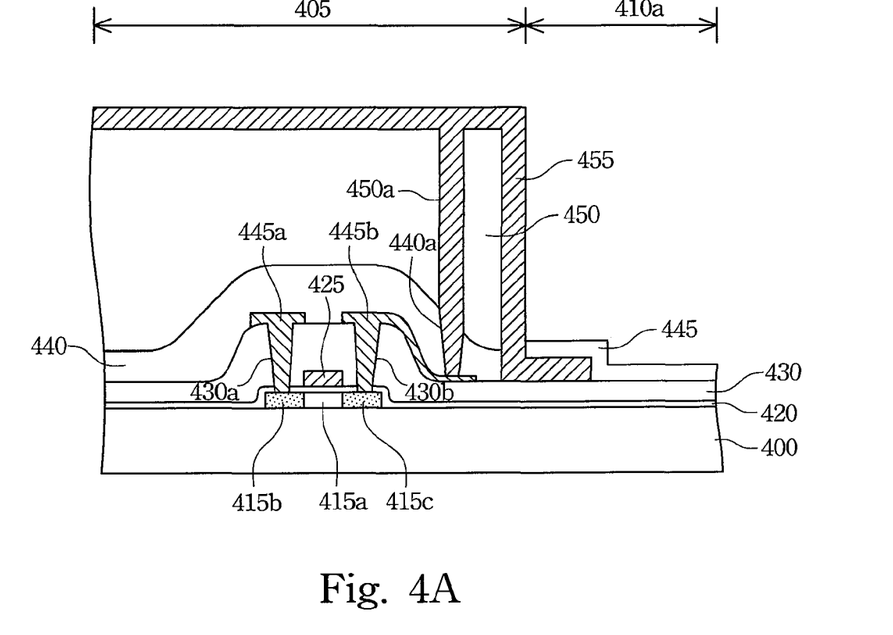
FIGS. 4A-4D are cross-sectional diagrams showing a process of manufacturing pixels of a transreflective LCD according to another embodiment of this invention.

The required process for obtaining the structure in FIG. 4A is roughly the same as the process for obtaining the red pixel structure in FIG. 3B. The only difference is that the gate dielectric layer 420 and the dielectric layer 430 on the transparent area 410a are not removed when the source opening 430a and the drain opening 430b are formed. Therefore, the height difference between the transparent area 410a and the reflective area 405 is the total thicknesses of the protective layer 440 and the photosensitive planar organic layer 450.

Figure 4B:
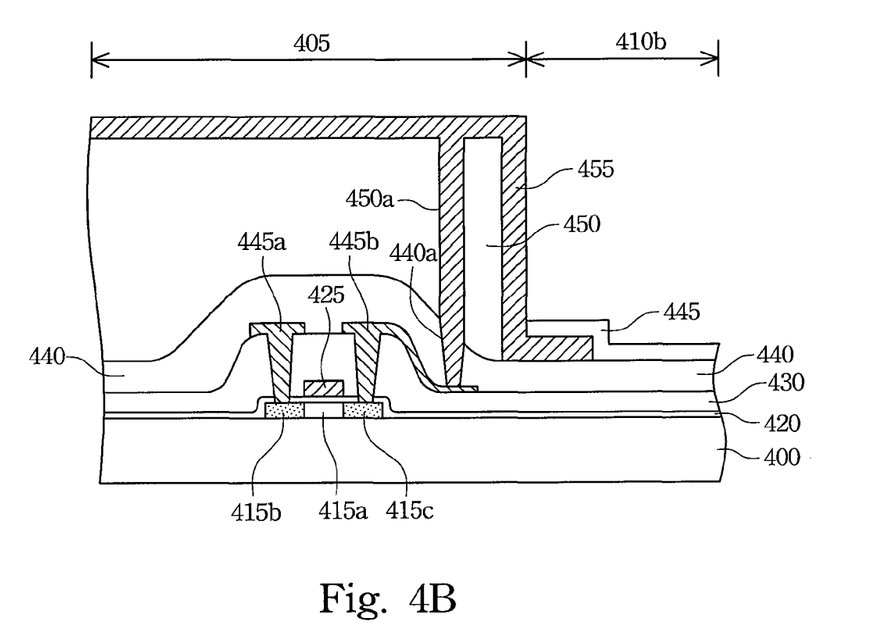

The required process for obtaining the structure in FIG. 4B is roughly the same as the process for obtaining the pixel structure in FIG. 4A. The only difference is the protective layer 440 on the transparent area 410b is not removed when forming the pixel opening 440a. Therefore, the height difference between the transparent area 410b and the reflective area 405 is the thickness of the photosensitive planar organic layer 450.

Figure 4C:
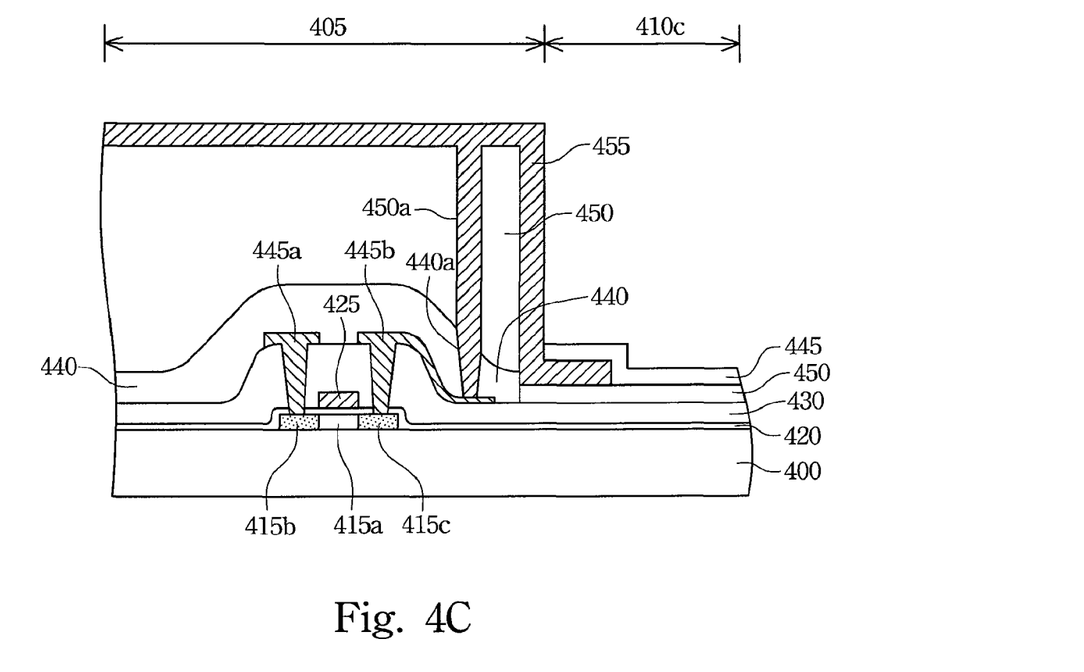

The required process for obtaining the structure in FIG. 4C is roughly the same as the process for obtaining the pixel structure in FIG. 4A. The only difference is that the gray tone photolithography is used to pattern the photosensitive planar organic layer 450 to leave the photosensitive planar organic layer 450 with a residual thickness on the transparent area 410c. Therefore, the height difference between the transparent area 410c and the reflective area 405 is the sum of the thickness of the protective layer 440 and the partial thickness of the photosensitive planar organic layer 450.

Figure 4D:
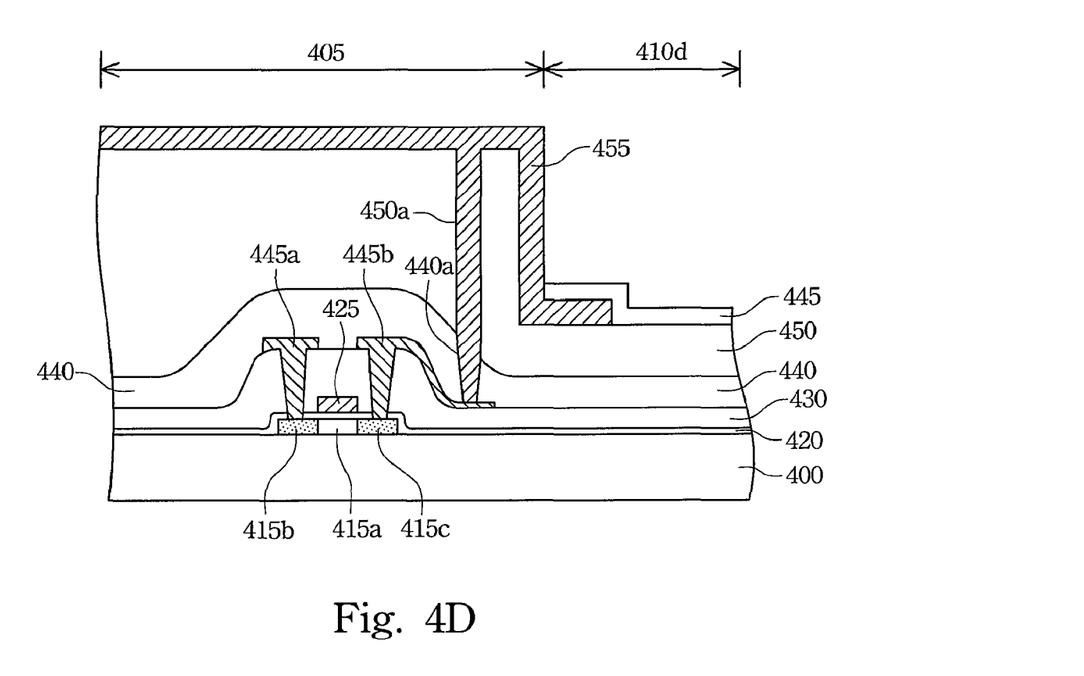

The required process for obtaining the structure in FIG. 4D is roughly the same as the process for obtaining the pixel structure in FIG. 4B. The only difference is that the gray tone photolithography is used to pattern the photosensitive planar organic layer 450 to leave the photosensitive planar organic layer 450 with a residual thickness on the transparent area 410d. Therefore, the height difference between the transparent area 410d and the reflective area 405 is the partial thickness of the photosensitive planar organic layer 450.

Although only top gate structure is demonstrated in the above example, the bottom gate structure in embodiment 2 can also be combined with the photosensitive planar organic layer with various exposing depths of embodiment 3 to adjust the cell gaps of various color pixels.

The method for producing pixels with various cell gaps can provide a choice for manufacturer to adjust the cell gaps of pixels according to the wavelength of selected color light. Therefore, the problem of chromatic dispersion and blue shift can be solved and transmission rates of various color lights can be increased (please see FIG. 7).

Transmission Rates of Red, Green, and Blue Color Lights

Figure 5A:
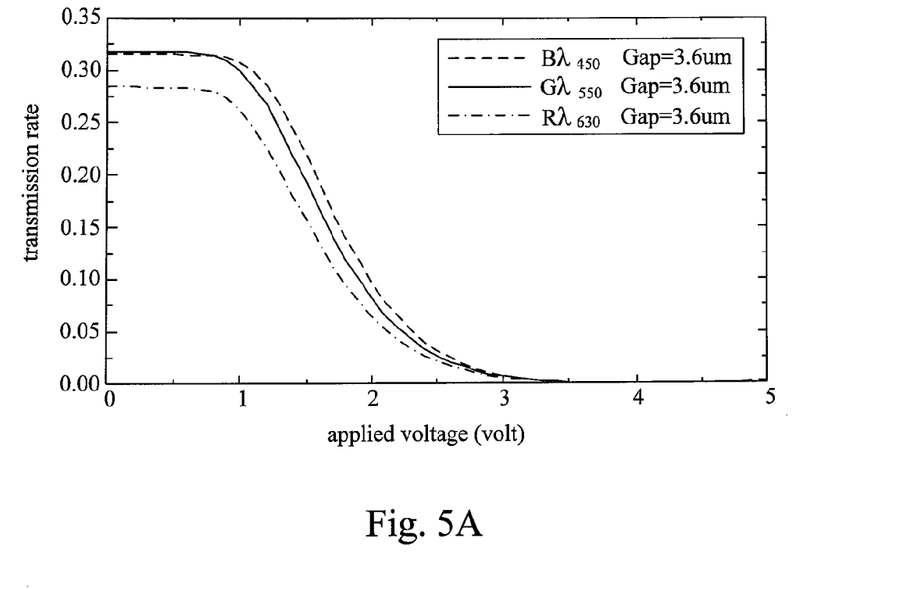
FIGS. 5A-5C are diagrams showing transmission percentage of various color light in a transreflective LCD with one, two, or three cell gaps under various applied voltage.
Figure 5B:
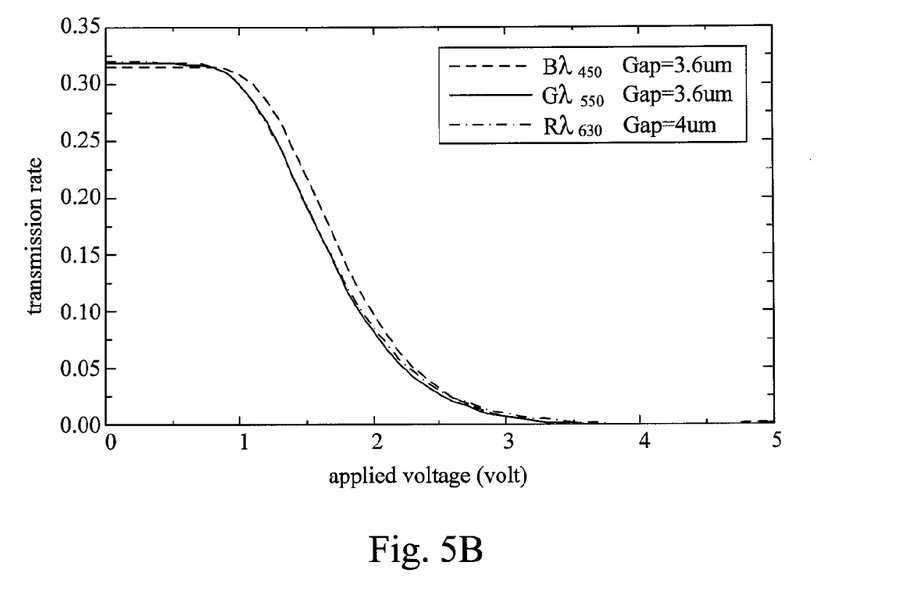
Figure 5C:
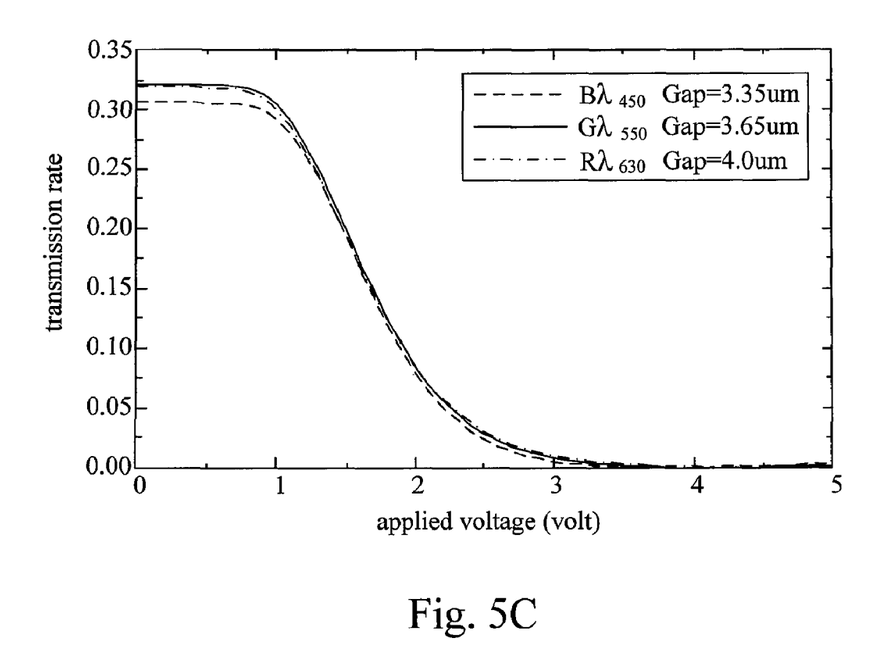

FIGS. 5A-5C are diagrams showing transmission rates of various color lights in a transreflective LCD with one, two, or three cell gaps under various applied voltages. In FIGS. 5A-5C, 450 nm (blue light), 550 nm (green light), and 630 nm (red light) are used to represent transmission rates of various color lights under various applied voltages.

In FIG. 5A, the cell gaps of the three color pixels (R, G, B) are 3.6 μm, and the transmission rate is not very consistent and chromatic dispersion is thus caused. In FIG. 5B, the cell gaps of blue and green pixels are 3.6 μm, and the cell gap of the red pixel is 4 μm. The result shows that the transmission rates of the three color lights are almost the same when the applied voltage is smaller than 1 volt. In FIG. 5C, the cell gaps of the blue, green, and red pixels are 3.35 μm, 3.65 μm, and 4.0 μm, respectively. The results show that the transmission rates of the three color lights are almost the same even when the applied voltage is larger than 1 volt.

Figure 6A:
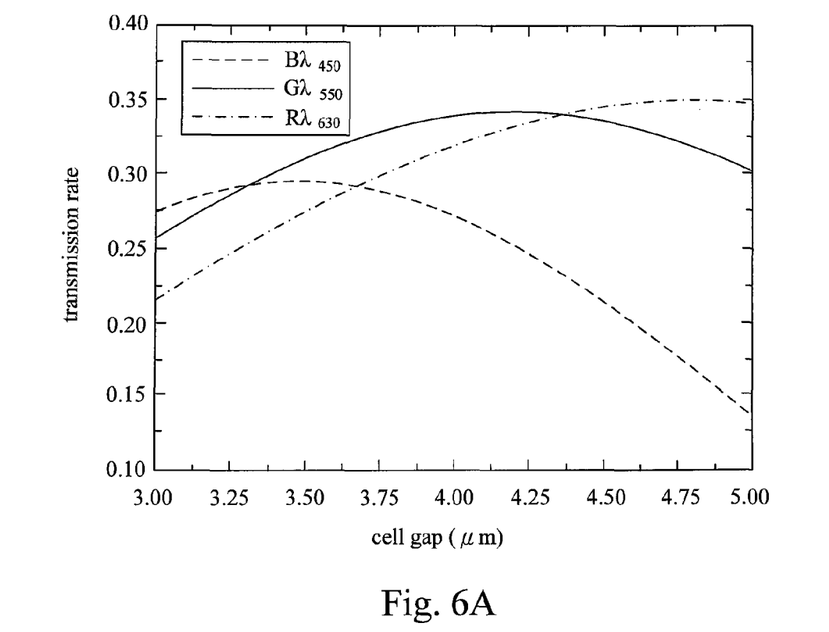
FIG. 6A is a diagram showing transmission rates of various color lights in a transreflective LCD having a single cell gap is a function of cell gap.

FIG. 6A is a diagram showing transmission rates of various color lights in a transreflective LCD having a single cell gap is a function of cell gap. The result shows that it is hard to find a single cell gap to allow three color lights to have high transmission rates.

Figure 6B:
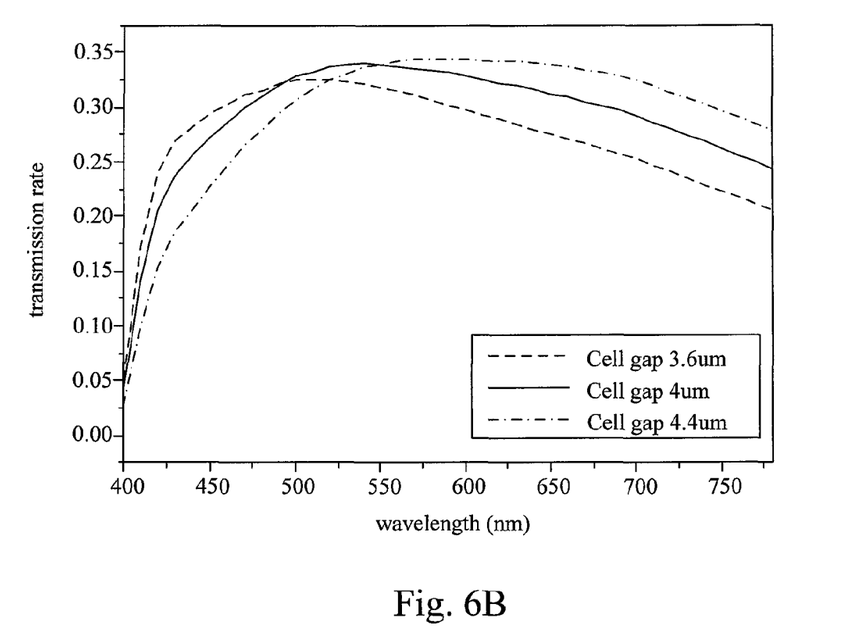
FIG. 6B is a diagram showing transmission rates of lights with various wavelengths in a transreflective LCD having three cell gaps.

FIG. 6B is a diagram showing transmission rates of lights with various wavelengths in a transreflective LCD having three cell gaps. In FIG. 6B, the three cell gaps of the transreflective LCD are 3.6 μm, 4.0 μm, and 4.4 μm. Light in a wavelength of 400-775 μm is used for the transmission test. The result shows that different cell gaps provide different transmission rates to lights with different wavelengths. Therefore, the cell gap of different color pixel can be individually designed to obtain higher transmission rate.

Embodiment 5

Generally, wide view angle LCD is assembled by an LCD of twisted nematic type and two compensate films and polarizers respectively attached on the outer surfaces of the top and bottom substrates. The two compensate films are ¼λ and ½λ, respectively, to increase the view angle of the LCD. However, it easily cause chromatic dispersion problem.

However, applying the multiple cell gap structures of the embodiments described above on a transreflective LCD of ECB (electrically controlled birefringence or electrically controlled bend) type, the chromatic dispersion is not increased even when the ½λ compensate film is removed.

Figure 7:
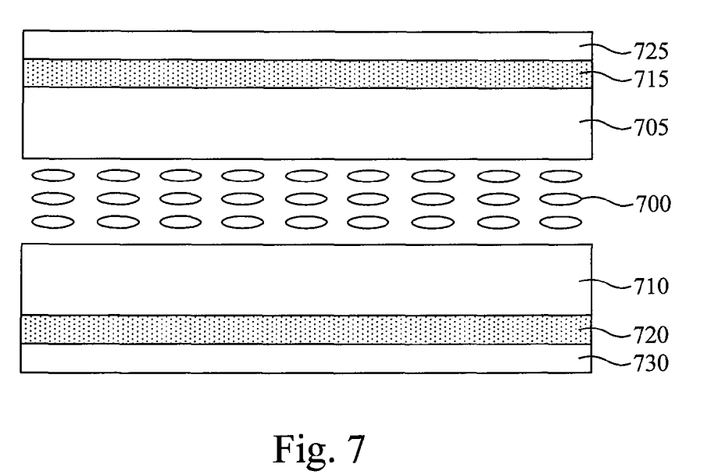
FIG. 7 is a cross-sectional diagram showing an ECB type transreflective LCD according to an embodiment of this invention.

FIG. 7 is a cross-sectional diagram showing an ECB type transreflective LCD according to an embodiment of this invention. In FIG. 7, a top substrate 705 and a bottom substrate 710 are respectively on the top and bottom sides of a liquid crystal layer 700. The optical films on the outer sides of the top substrate 705 are a first compensate film (¼λ) 715 and a first polarizer 725. The optical films on the outer sides of the bottom substrate 710 are a second compensate film (¼λ) 720 and a second polarizer 730.

Figure 8:
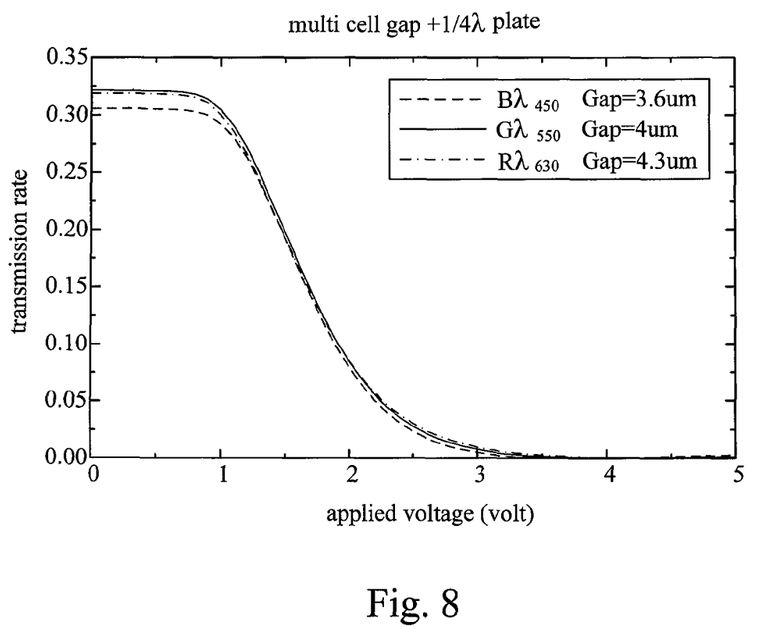
FIG. 8 is a diagram showing the chromatic dispersion of the ECB type transreflective LCD in FIG. 7 under various applied voltage.

FIG. 8 is a diagram showing the chromatic dispersion of the ECB type transreflective LCD in FIG. 7 under various applied voltages. The cell gaps of the blue, green, and red pixels are 3.6 μm, 4.0 μm, and 4.3 μm, respectively. The result shows that the transmission rates of the blue, green, and red lights are quite consistent when the applied voltage is larger than 1 volt. Therefore, the ECB type transreflective LCD in FIG. 7 can preserve the advantages of both wide view angle and low chromatic dispersion.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A multiple cell gaps transflective liquid crystal display, comprising:
- a first substrate, having a first pixel area, a second pixel area and a third pixel area, each of the first pixel area, the second pixel area and the third pixel area having a reflective area and a transparent area, respectively;
- a first dielectric layer, formed on the first substrate in the first pixel area, the second pixel area and the third pixel area, and exposing a portion of the first substrate in the transparent area of the third pixel area;
- a second dielectric layer, formed on the first dielectric layer in the first pixel area, the second pixel area and the third pixel area, and exposing a portion of the first dielectric layer in the transparent area of the second pixel area and the portion of the first substrate in the transparent area of the third pixel area;
- a plurality of transparent electrodes, formed on a portion of the second dielectric layer in the transparent area of the first pixel area, the portion of the first dielectric layer in the transparent area of the second pixel area and the portion of the substrate in the transparent area of the third pixel area;
- a plurality of reflective electrodes, formed on the second dielectric layer in each of the reflective areas;
- a second substrate, disposed opposite to the first substrate; and
- a liquid crystal layer, sealed between the first substrate and the second substrate, wherein the first substrate and the second substrate separates with a first cell gap, a second cell gap and a third cell gap in the transparent areas of the first pixel area, the second pixel area and the third pixel area, respectively.

2. The multiple cell gaps transflective liquid crystal display of claim 1, wherein the first pixel area, the second pixel area and the third pixel area are blue pixel area, green pixel area and red pixel area, respectively.

3. The multiple cell gaps transflective liquid crystal display of claim 1, wherein the first dielectric layer comprises a gate dielectric layer and an interlayer dielectric layer.

4. The multiple cell gaps transflective liquid crystal display of claim 1, wherein the second dielectric layer comprises a protective layer.

5. The multiple cell gaps transflective liquid crystal display of claim 1, wherein the first dielectric layer includes a silicon oxide layer, a silicon oxynitride layer, or a combination thereof.

6. The multiple cell gaps transflective liquid crystal display of claim 1, wherein a material of the second dielectric layer comprises silicon nitride.

7. The multiple cell gaps transflective liquid crystal display of claim 1, wherein a material of the reflective electrode comprises aluminum.

8. The multiple cell gaps transflective liquid crystal display of claim 1, wherein a material of the transparent electrode comprises indium tin oxide.

9. The multiple cell gaps transflective liquid crystal display of claim 1, wherein the liquid crystal layer comprises an electrically controlled birefringence (ECB) type liquid crystal layer.

10. The multiple cell gaps transflective liquid crystal display of claim 1, further comprises an organic layer located between the second dielectric layer and the reflective layer in each of the reflective areas.

11. The multiple cell gaps transflective liquid crystal display of claim 1, further comprises a gate, a gate dielectric layer, a silicon island, a source metal and a drain metal, wherein the gate dielectric layer is located between the gate and the silicon island, and the source metal and the drain metal are connected to both sides of the silicon island, respectively.

12. The multiple cell gaps transflective liquid crystal display of claim 11, wherein the reflective electrode and the transparent electrode are electrically connected to the drain metal.

13. The multiple cell gaps transflective liquid crystal display of claim 1, further comprises a first polarizer, a first compensative film (¼λ), a second polarizer, a second compensative film (¼λ), wherein the first compensative film is positioned between the first polarizer and the first substrate, and the second compensative film is positioned between the second polarizer and the second substrate.

* * * * *